United States Patent
Imai et al.

(10) Patent No.: US 12,346,682 B2
(45) Date of Patent: Jul. 1, 2025

(54) FUNCTION MANAGEMENT SYSTEM AND FUNCTION MANAGEMENT METHOD

(71) Applicant: HONDA MOTOR CO., LTD., Tokyo (JP)

(72) Inventors: Naoko Imai, Tokyo (JP); Atsuyuki Suzuki, Tokyo (JP); Koji Tohmiya, Tokyo (JP); Ryo Saiki, Tokyo (JP); Mitsutaka Koyata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 195 days.

(21) Appl. No.: 18/167,246

(22) Filed: Feb. 10, 2023

(65) Prior Publication Data
US 2023/0281000 A1 Sep. 7, 2023

(30) Foreign Application Priority Data
Mar. 3, 2022 (JP) .................................. 2022-032545

(51) Int. Cl.
*G06F 8/65* (2018.01)
*G06Q 30/0283* (2023.01)

(52) U.S. Cl.
CPC ........... *G06F 8/65* (2013.01); *G06Q 30/0283* (2013.01)

(58) Field of Classification Search
None
See application file for complete search history.

(56) References Cited

U.S. PATENT DOCUMENTS

| 11,292,406 | B2* | 4/2022 | Sasaki | G01C 21/367 |
|---|---|---|---|---|
| 2007/0299577 | A1* | 12/2007 | Hattori | G07C 9/00563 |
| | | | | 701/29.6 |
| 2016/0306960 | A1* | 10/2016 | Gajulapalli | B61L 15/0063 |
| 2019/0163466 | A1* | 5/2019 | Kiyama | H04W 4/44 |
| 2020/0167241 | A1 | 5/2020 | Higuchi et al. | |
| 2020/0290536 | A1* | 9/2020 | Sasaki | G01C 21/367 |
| 2021/0091956 | A1* | 3/2021 | Mullett | G06F 8/71 |
| 2021/0165858 | A1* | 6/2021 | Murata | H04W 12/08 |

(Continued)

FOREIGN PATENT DOCUMENTS

| JP | 2020-17009 A | 1/2020 |
|---|---|---|
| JP | 2020-129791 A | 8/2020 |

(Continued)

OTHER PUBLICATIONS

Malik, "Over-the-Air Software-Defined Vehicle Updates Using Federated Fog Environment", 2022, IEEE (Year: 2022)*

(Continued)

*Primary Examiner* — Hossain M Morshed
(74) *Attorney, Agent, or Firm* — Rankin, Hill & Clark LLP (57) ABSTRACT

A function management system includes a first acquisition unit configured to acquire information about a first function that is a function installed on a first vehicle, a second acquisition unit configured to acquire information about a second function that is a function installed on a second vehicle, a selection unit configured to select, based on the information about the first function and the information about the second function, an additional function that is a function to be added to the second vehicle, and a transmission unit configured to transmit, to the second vehicle, an addition program that is a program for adding the additional function.

15 Claims, 5 Drawing Sheets

(56) References Cited

U.S. PATENT DOCUMENTS

| | | | | |
|---|---|---|---|---|
| 2022/0012043 A1* | 1/2022 | Sakurai | ............... | H04L 9/3239 |
| 2022/0208011 A1* | 6/2022 | Holmes | ................. | H04W 4/42 |
| 2022/0253234 A1* | 8/2022 | Mizutani | ............. | G06F 3/0604 |
| 2023/0100326 A1* | 3/2023 | Kato | .................. | B60R 16/023 |
| | | | | 717/174 |
| 2023/0177615 A1* | 6/2023 | Slusar | ................. | G06Q 40/08 |
| | | | | 705/4 |
| 2023/0281000 A1* | 9/2023 | Imai | ................... | G06F 9/4451 |
| | | | | 717/170 |

FOREIGN PATENT DOCUMENTS

| | | |
|---|---|---|
| JP | 2020-158003 A | 10/2020 |
| JP | 2021-135879 A | 9/2021 |

OTHER PUBLICATIONS

Japanese Office Action dated Oct. 3, 2023, Japanese Application JP 2022-032545, English translation included, 7 pages.

* cited by examiner

FUNCTION MANAGEMENT SYSTEM AND FUNCTION MANAGEMENT METHOD

INCORPORATION BY REFERENCE

The present application claims priority under 35 U.S.C. § 119 to Japanese Patent Application No. 2022-032545 filed on Mar. 3, 2022. The content of the application is incorporated herein by reference in its entirety.

BACKGROUND OF THE INVENTION

Field of the Invention

The present invention relates to a function management system and a function management method for managing functions installed on a vehicle.

Description of the Related Art

Japanese Patent Laid-Open No. 2020-158003 discloses a vehicle setting succession system that automatically performs vehicle settings, when a user drives different vehicles. This system is for learning the user's characteristics information in a first vehicle, determining the user's setting values in a second vehicle based on the characteristics information obtained by the learning and vehicle-specific vehicle body information in the second vehicle, and setting the equipment of the second vehicle based on the determined setting values.

The above-described conventional technique includes performing the settings of the second vehicle within a range of the vehicle-specific vehicle body information in the second vehicle. On the other hand, there are vehicles to which various functions can be added depending on the optionally selected equipment, even if they are of the same type.

The present invention intends to reduce, when a user uses a plurality of vehicles, differences in vehicle functions among the vehicles and improve convenience for the user.

SUMMARY OF THE INVENTION

An aspect of the present invention is a function management system that manages functions to be installed on a vehicle, the function management system including a first acquisition unit configured to acquire information about a first function that is a function installed on a first vehicle, a second acquisition unit configured to acquire information about a second function that is a function installed on a second vehicle, a selection unit configured to select, based on the information about the first function and the information about the second function, an additional function that is a function to be added to the second vehicle, and a transmission unit configured to transmit, to the second vehicle, an addition program that is a program for adding the additional function.

According to another aspect of the present invention, the transmission unit transmits the addition program to the second vehicle, in response to reception of a reservation from a user for using the second vehicle.

According to another aspect of the present invention, the transmission unit transmits the addition program to the second vehicle, by a scheduled time of a user getting on the second vehicle.

According to another aspect of the present invention, the additional function includes a function that is included in the first function not included in the second function.

According to another aspect of the present invention, the information about the first function includes information on a use frequency of the first function installed on the first vehicle, and the transmission unit transmits, to the second vehicle, functions included in the additional function in order of the use frequency of the first function corresponding to the function to be transmitted.

According to another aspect of the present invention, the additional function includes a superordinate function that includes a new function, which is a function not included in the first function, or an updated version function obtained by updating the function included in the first function.

According to another aspect of the present invention, a second guidance unit is provided in the second vehicle and configured to perform, when a user of the first vehicle gets on the second vehicle, guidance for the user about the superordinate function.

According to another aspect of the present invention, a second guidance unit is provided in the second vehicle and configured to perform, in response to detection of a start of riding the second vehicle by a user of the first vehicle, guidance for the user about the superordinate function.

According to another aspect of the present invention, the second guidance unit queries the user about whether to add the superordinate function to the first vehicle.

According to another aspect of the present invention, the second guidance unit makes the query at a predetermined occasion including a time when the user finishes using the second vehicle.

According to another aspect of the present invention, the second acquisition unit acquires information on the number of times that the user uses each of the superordinate functions in the second vehicle, and the second guidance unit makes the query about the superordinate function that has been used a predetermined number of times or more.

According to another aspect of the present invention, when the user instructs to add the superordinate function to the first vehicle in response to the query, the transmission unit transmits, to the first vehicle, the addition program for adding the instructed superordinate function, and the first vehicle has a first guidance unit provided in the first vehicle and configured to perform guidance about the superordinate function added to the first vehicle at the user's getting-on time.

According to another aspect of the present invention, a second settlement processing unit is provided in the second vehicle and configured to execute settlement related processing for fees relevant to usage of the function installed on the second vehicle, and a settlement management unit is configured to manage execution of the settlement related processing in the second settlement processing unit, in which the settlement management unit prohibits the second settlement processing unit from executing the settlement related processing for the fees relevant to the function that a user of the first vehicle has used in the second vehicle.

According to another aspect of the present invention, a first settlement processing unit is provided in the first vehicle and configured to execute settlement related processing for the fees relevant to the function that the user has used in the second vehicle.

Another aspect of the present invention is a function management method that is performed by at least one computer provided in a function management system that manages functions to be installed on a vehicle, the function management method including a first step of acquiring information about a first function that is a function installed on a first vehicle, a second step of acquiring information about a second function that is a function installed on a second vehicle, a third step of selecting, based on the information about the first function and the information about the second function, an additional function that is a function to be added to the second vehicle, and a fourth step of transmitting, to the second vehicle, an addition program that is a program for adding the additional function.

According to the present invention, when a user uses a plurality of vehicles, differences in vehicle functions among the vehicles can be reduced and therefore convenience for the user can be improved.

DETAILED DESCRIPTION OF THE PREFERRED EMBODIMENT

Embodiment

Hereinafter, embodiments of the present invention will be described with reference to attached drawings.

Figure 1:
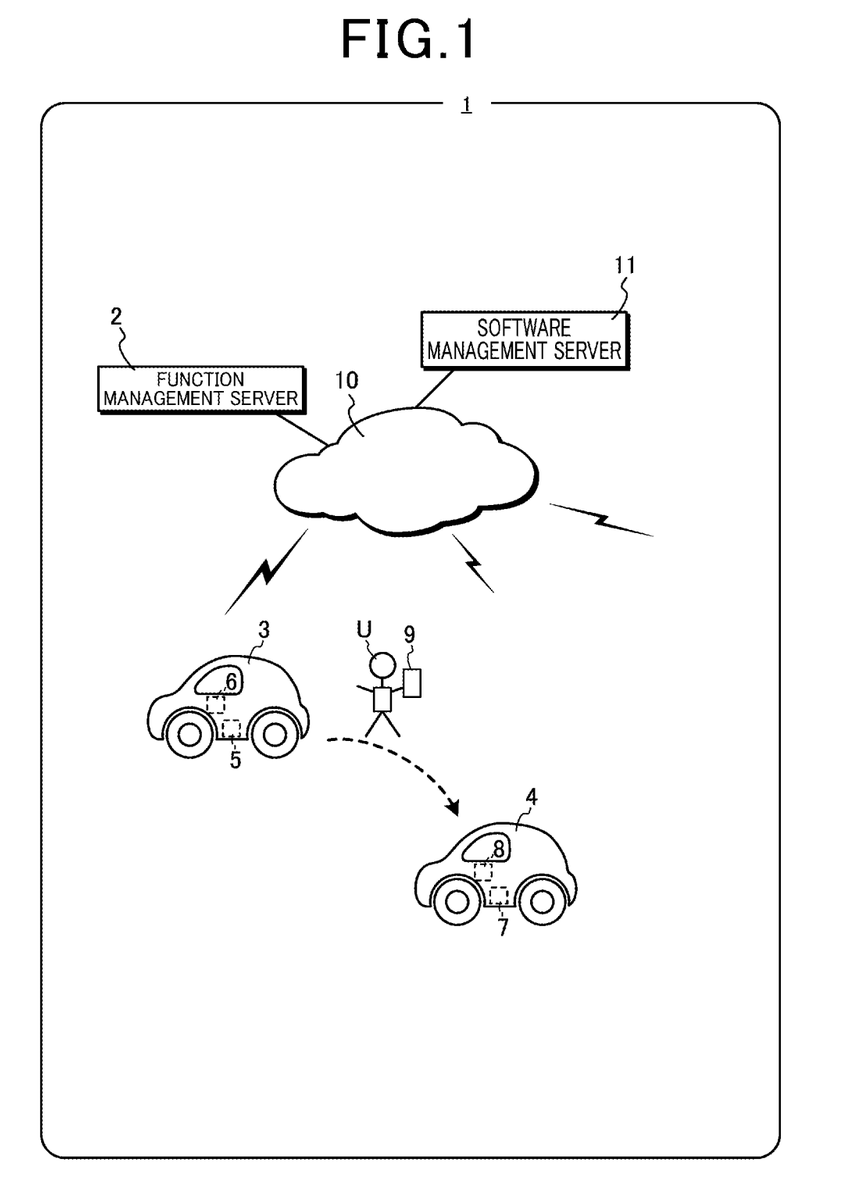
FIG. 1 is a diagram illustrating the configuration of a function management system according to an embodiment of the present invention.

FIG. 1 is a diagram illustrating the configuration of a function management system 1 according to an embodiment of the present invention. This function management system 1 manages, when a user U changes from a first vehicle 3 to a second vehicle 4, functions to be installed on the second vehicle 4.

The function management system 1 includes a function management server 2, the first vehicle 3, and the second vehicle 4. The first vehicle 3 is, for example, a vehicle owned by the user U. The second vehicle 4 is, for example, an arbitrary substitute vehicle that is temporarily used by the user U when the first vehicle 3 cannot be used due to inspection.

In the present embodiment, the function management system 1 specifically performs installed function adjustment for the second vehicle 4, so that a function installed on the second vehicle 4, which may be temporarily used by the user U, becomes equivalent to the function of the first vehicle 3 owned by the user U by the time when the user U starts using the second vehicle 4. Functions installed on the first vehicle 3 and the second vehicle 4 may include, for example, drive assist functions, entertainment service functions, and the like. Further, in the present embodiment, the functions installed on the first vehicle 3 and the second vehicle 4 may include functions that require usage fees or purchase fees when they are used.

The first vehicle 3 includes a first ECU group 5 configured by a plurality of electronic control devices (ECUs) (computer) and a first management device 6 that manages software installation to each of the first ECU group 5. Further, the second vehicle 4 includes a second ECU group 7 configured by a plurality of electronic control devices and a second management device 8 that manages software installation to each of the second ECU group 7.

The function management server 2, the first management device 6 of the first vehicle 3, the second management device 8 of the second vehicle 4, and a portable terminal 9 of the user U are communicably connected via a communication network 10. Further, a software management server 11 is connected to the communication network 10. The software management server 11 stores software programs that can be installed on respective ECUs of the first ECU group 5 and the second ECU group 7.

Figure 2:
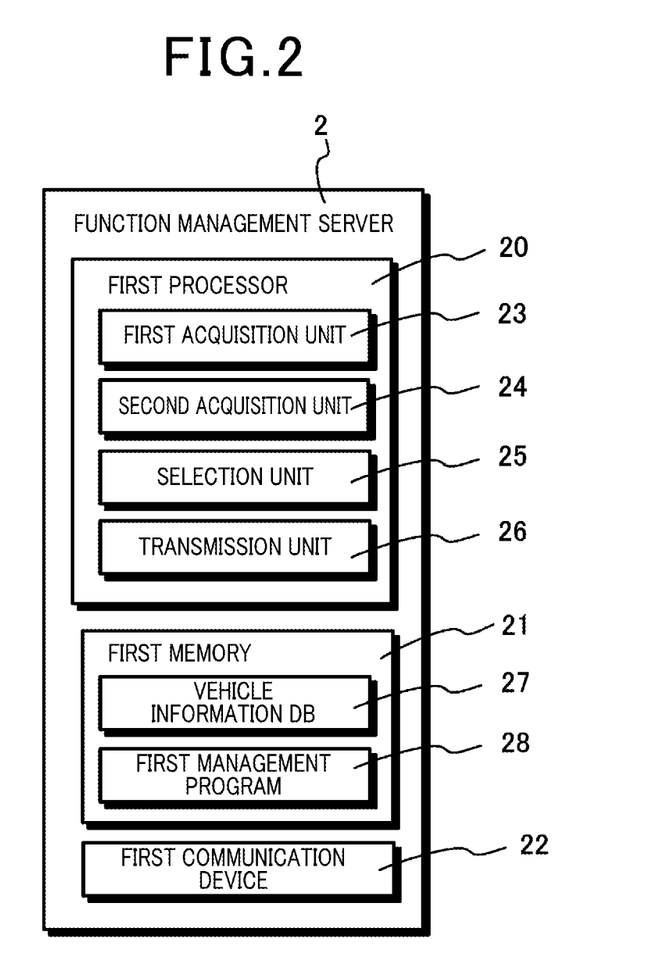
FIG. 2 is a diagram illustrating the configuration of a function management server.

FIG. 2 is a diagram illustrating an example of the configuration of the function management server 2. The function management server 2 includes a first processor 20, a first memory 21, and a first communication device 22. The first memory 21 is, for example, configured by a volatile and/or nonvolatile semiconductor memory and/or a hard disk device. The first memory 21 stores a vehicle information database (DB) 27. Access information for communicating with the first management device 6 of the first vehicle 3 owned by the user U and access information for communicating with the second management device 8 of the second vehicle 4 are stored in the vehicle information DB 27.

The first communication device 22 is a transmitter and a receiver that enable the function management server 2 to communicate, via the communication network 10, with the first management device 6, the second management device 8, the portable terminal 9, and the software management server 11.

The first processor 20 is a computer that includes, for example, a central processing unit (CPU). The first processor 20 may have a configuration including a read only memory (ROM) for storing programs written in advance, a random access memory (RAM) for temporarily storing various data, and the like. Further, the first processor 20 has functional elements or functional units, such as a first acquisition unit 23, a second acquisition unit 24, a selection unit 25, and a transmission unit 26.

These functional elements provided in the first processor 20 can be realized, for example, when a first management program 28 stored in the first memory 21 is executed by the first processor 20 that is a computer. The first management program 28 can be stored in an arbitrary computer-readable storage medium.

Alternatively, the whole or part of the above-described functional elements provided in the first processor 20 can also be configured by hardware including one or more electronic circuit components.

The first acquisition unit 23 acquires information about the first function, which is a function installed on the first vehicle 3, from the first management device 6 of the first vehicle 3. Specifically, the information about the first function includes version information of software installed in each ECU of the first ECU group 5 provided in the first vehicle 3, and information on the use frequency of the function provided by this software. The use frequency may be, for example, defined as the number of times this function has been used in the last predetermined number of times (for example, 50 times) with respect to use of the first vehicle 3.

The second acquisition unit 24 acquires information about the second function, which is the function installed on the second vehicle 4, from the second management device 8 of the second vehicle 4. For example, the second acquisition unit 24 acquires the information about the second function, in response to reception of a reservation of using the second vehicle 4 from the portable terminal 9 of the user U of the first vehicle 3. The reservation of use includes, for example, vehicle identification information for identifying the second vehicle 4 and a scheduled time of the user U getting on the second vehicle 4. The scheduled getting-on time may be, for example, a start time of the reservation of the second vehicle set by the user U at the time of reservation of use, or may be another time.

Further, the second acquisition unit 24 acquires, from the second management device 8, information on the number of times that the user U used the superordinate function (described below) in the second vehicle 4, when the use of the second vehicle 4 by the user U is finished.

The selection unit 25 selects an additional function, which is a function to be added to the second vehicle 4, based on the information about the first function in the first vehicle 3 acquired by the first acquisition unit 23 and the information about the second function in the second vehicle 4 acquired by the second acquisition unit 24. In the present embodiment, the additional function is selected as a function to be added to the second vehicle 4 so that the function installed on the second vehicle 4, which may be temporarily used by the user U, becomes equivalent to the function of the first vehicle 3 owned by the user U. That is, the additional function includes functions not included in the second function currently installed on the second vehicle 4, among functions included in the first function installed on that the first vehicle 3. When the same function as that installed on the first vehicle 3 cannot be installed on the second vehicle 4, for example, due to the fact that the second vehicle 4 is different in type from the first vehicle 3, the selection unit 25 regards a function installable on the second vehicle 4 and comparable to the function installed on the first vehicle 3 as being included in the above-described additional function.

Further, the above-described additional function may be defined as including a superordinate function that includes a new function, which is a function not included in the above-described first function, or an updated version function obtained by updating the function included in the above-described first function. Here, the updated version function is specifically a function provided by any ECU of the first ECU group 5 of the first vehicle 3, and is a function realized by software of a superordinate version of the software currently installed on this ECU. Further, the new function may be, for example, a superordinate drive assist function of a corresponding drive assist function currently installed in the first vehicle 3.

The transmission unit 26 acquires, from the software management server 11, a software program for adding the above-described additional function to the second vehicle 4, and then transmits it, as an addition program, to the second vehicle 4. The transmission unit 26 performs transmission of the above-described addition program to the second vehicle 4 by the scheduled time of the user U getting on the second vehicle 4. This makes it possible to bring the second vehicle 4 into a state where the additional function is already installed at the time when the user U gets on, and therefore convenience for the user U can be improved.

Further, the transmission unit 26 transmits, to the second vehicle 4, addition programs of functions included in the above-described additional function, in descending order of the use frequency of the first function corresponding to the function to be transmitted. For example, this makes it possible to enable the user U to use, at least, functions frequently used in the second vehicle 4, even when it takes time to install addition programs and accordingly installation of all the additional functions cannot be completed before the user U gets on the second vehicle 4. Therefore, convenience for the user U can be improved.

Further, as described above, the additional function to be added to the second vehicle 4 can include the superordinate function that includes the new function or the updated version function. Therefore, for example, it becomes possible for a vendor of the first vehicle 3 and the second vehicle 4 to enable the user U to try the new function or the updated version function described above in the second vehicle 4, and therefore it is possible to promote sales of these functions.

Further, when the user U instructs adding the superordinate function in response to the query about whether to add the superordinate function to the first vehicle 3, which is performed for the user U by a below-described second guidance unit 45 of the second vehicle 4, the transmission unit 26 receives this instruction from the second management device 8 and transmits the addition program for adding the instructed superordinate function to the first vehicle 3. This makes it possible for the above-described vendor to quickly promote from trial provision to sales of the new function or the updated version function.

Figure 3:
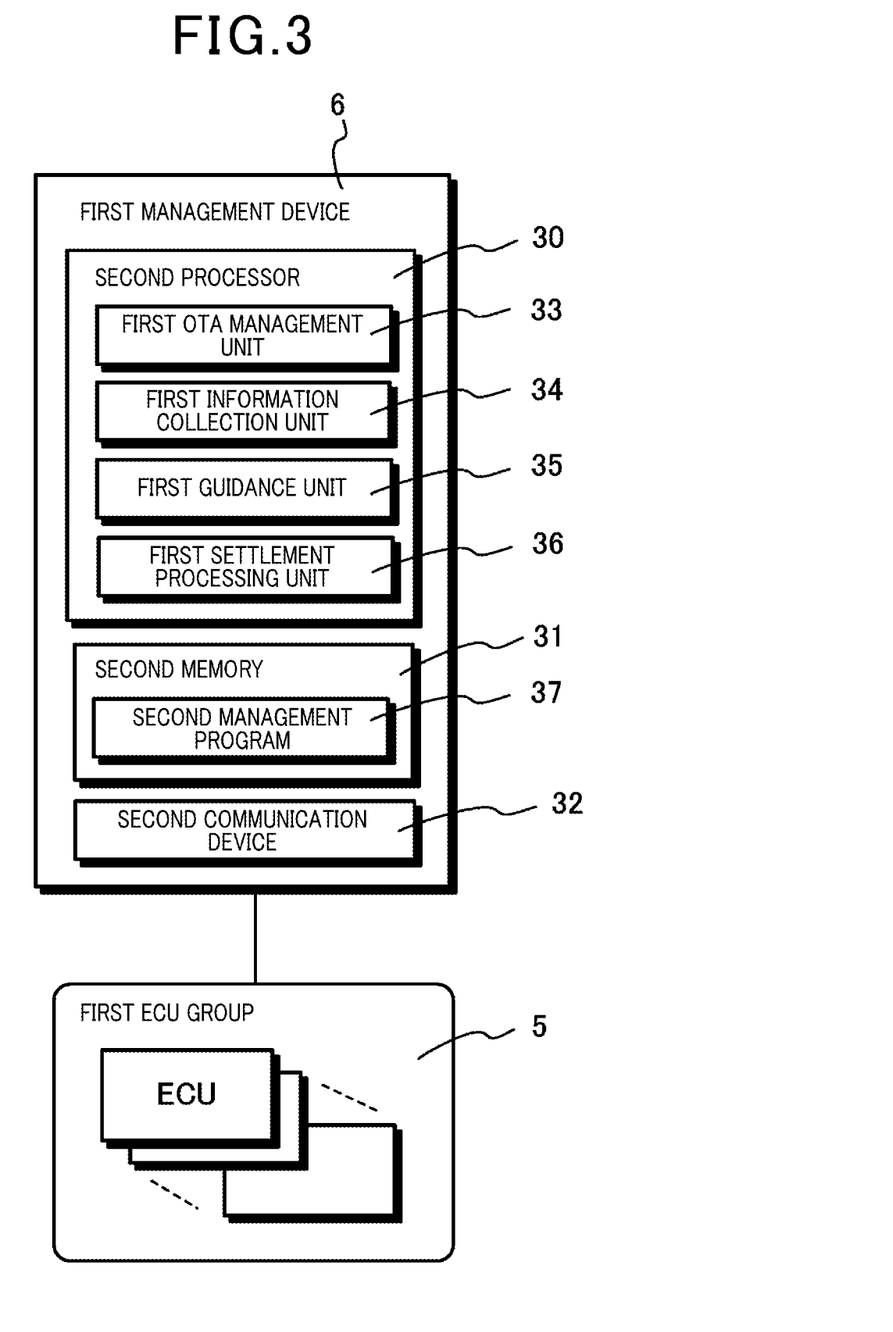
FIG. 3 is a diagram illustrating the configuration of a first management device included in a first vehicle.

Next, the configuration of the first management device 6 included in the first vehicle 3 will be described. FIG. 3 is a diagram illustrating an example of the configuration of the first management device 6.

The first management device 6 has a second processor 30, a second memory 31, and a second communication device 32. The second memory 31 is, for example, configured by a volatile and/or nonvolatile semiconductor memory, and/or a hard disk device. The second communication device 32 is a transmitter and a receiver that enable the first management device 6 to communicate with another device such as the function management server 2 via the communication network 10.

The second processor 30 is a computer that includes, for example, a CPU. The second processor 30 may have a configuration including a ROM for storing programs written in advance, a RAM for temporarily storing various data, and the like. The second processor 30 has functional elements or functional units such as a first OTA management unit 33, a first information collection unit 34, a first guidance unit 35, and a first settlement processing unit 36.

These functional elements provided in the second processor 30 can be realized, for example, when a second management program 37 stored in the second memory 31 is executed by the second processor 30 that is a computer. The second management program 37 can be stored in an arbitrary computer-readable storage medium. Alternatively, the whole or part of the above-described functional elements provided in the second processor 30 can also be configured by hardware including one or more electronic circuit components.

The first OTA management unit 33 manages execution of a so-called OTA function (Over The Air function), receives a software program to be installed in any ECU of the first ECU group 5 from the function management server 2, and installs the received software program on the corresponding ECU. The above-described corresponding ECU, when the first vehicle 3 is not in use, receives the above-described software program via the first OTA management unit 33 and performs installation processing. The above-described corresponding ECU, when a memory provided in this ECU has a sufficient storage capacity, may be configured to receive the above-described software program via the first OTA management unit 33 and store the received software program in the above-described memory, even when the first vehicle 3 is in use. Subsequently, the above-described corresponding ECU may perform processing for installing the above-described stored software program when the first vehicle 3 is not in use.

The first information collection unit 34 collects information about the first function that is the function installed on the first vehicle 3 (that is, the function provided by the ECU of the first ECU group 5). The first information collection unit 34 transmits the collected information about the first function to the function management server 2. As described above, the information about the first function to be transmitted to the function management server 2 includes information on the use frequency of the above-described function installed on the first vehicle 3. Further, the first information collection unit 34 transmits the information about the function installed on the first vehicle 3 to the first settlement processing unit 36 described below.

When the user U gets on the first vehicle 3 after the transmission unit 26 of the above-described function management server 2 receives the addition program of the superordinate function based on an instruction of the user U for the second guidance unit 45 of the second vehicle 4, the first guidance unit 35 performs guidance about the above-described superordinate function added to the first vehicle 3 by the above-described addition program. The above-described guidance may be defined as being performed, for example, after the installation of the above-described addition program from the ECU of the first ECU group 5 has completed. Further, the above-described guidance may be defined, for example, as notification of the added superordinate function or explanation about contents and/or way to use of the added superordinate function. Information about the contents or the like of the superordinate function required for the above-described guidance may be defined as being acquired from the function management server 2.

Further, a display device and/or speaker (none of which is illustrated) provided in the first vehicle 3 may be configured to perform the above-described guidance.

The first settlement processing unit 36 performs settlement related processing for the fees (for example, usage fees or purchase fees) relevant to usage of the function installed on the first vehicle 3. Here, the settlement related processing may include, for example, transmission or relay communication of private information (for example, credit card information, bank account information, etc.) to a server of a financial institution involved in the settlement.

Further, the first settlement processing unit 36 receives information on a function that the user U has used in the second vehicle 4, from a settlement management unit 47 of the second vehicle 4. Then, the first settlement processing unit 36 executes settlement related processing for the fees relevant to the function that the user U has used in the second vehicle 4. This enables the user U to perform settlement of the fees in the first vehicle 3 owned by the user, and therefore convenience for the user U can be improved.

Figure 4:
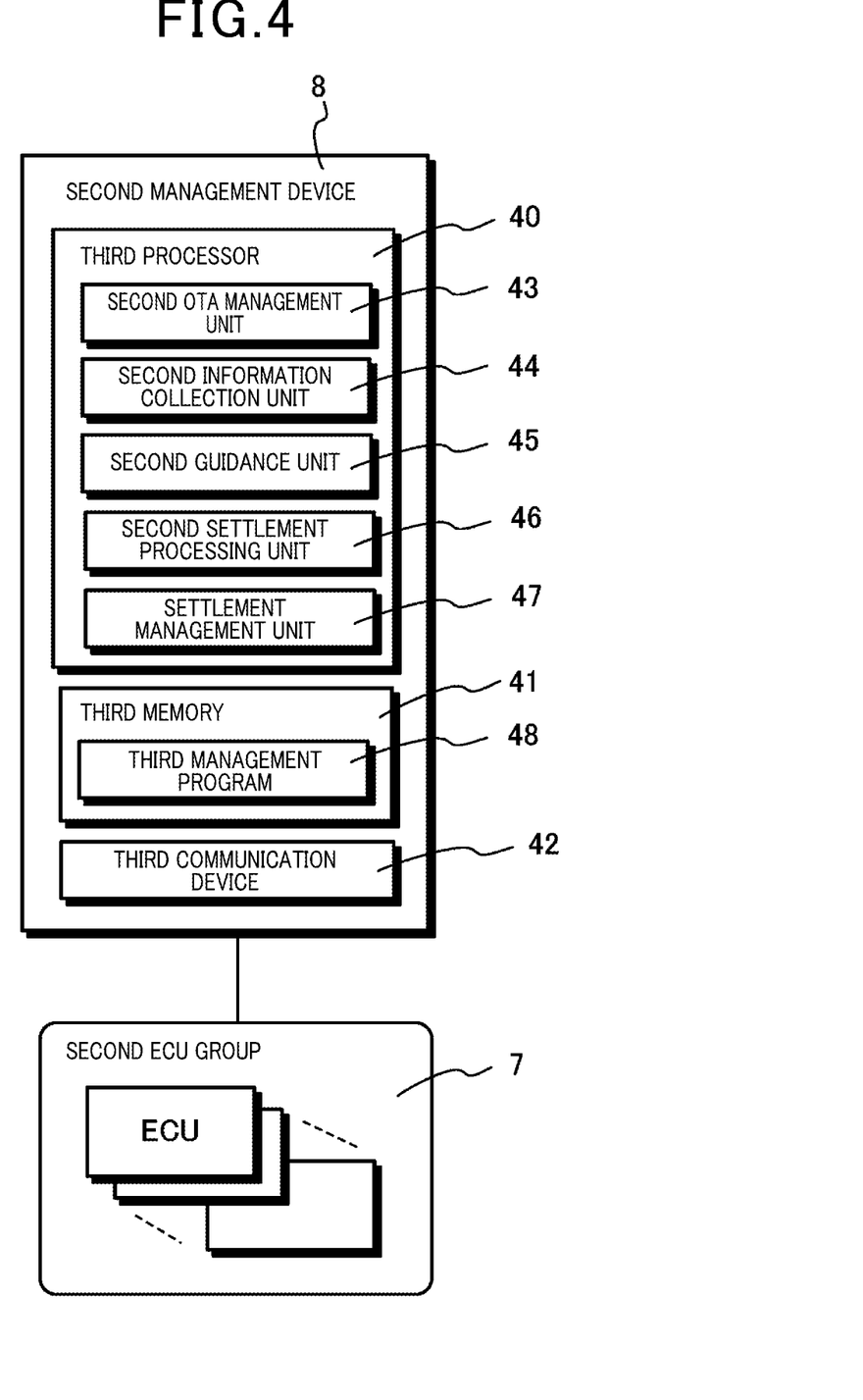
FIG. 4 is a diagram illustrating the configuration of a second management device included in a second vehicle.

Next, the configuration of the second management device 8 provided in the second vehicle 4 will be described. FIG. 4 is a diagram illustrating an example of the configuration of the second management device 8.

The second management device 8 has a third processor 40, a third memory 41, and a third communication device 42. The third memory 41 is, for example, configured by a volatile and/or nonvolatile semiconductor memory, and/or a hard disk device. The third communication device 42 is a transmitter and a receiver that enable the second management device 8 to communicates with another device such as the function management server 2 via the communication network 10.

The third processor 40 is a computer that includes, for example, a CPU. The third processor 40 may have a configuration including a ROM for storing programs written in advance, a RAM for temporarily storing various data, and the like. Further, the third processor 40 has functional elements or functional units, such as a second OTA management unit 43, a second information collection unit 44, the second guidance unit 45, a second settlement processing unit 46, and the settlement management unit 47.

These functional elements provided in the third processor 40 can be realized, for example, when a third management program 48 stored in the third memory 41 is executed by the third processor 40 that is a computer. The third management program 48 can be stored in an arbitrary computer-readable storage medium. Alternatively, the whole or part of the above-described functional elements provided in the third processor 40 can also be configured by hardware including one or more electronic circuit components.

The second OTA management unit 43 manages execution of the OTA function in the second vehicle 4, receives a software program to be installed in any ECU of the second ECU group 7 from the function management server 2, and installs the received software program on the corresponding ECU. The above-described corresponding ECU, when the second vehicle 4 is not in use, receives the above-described software program via the second OTA management unit 43 and performs installation processing. Like the first vehicle 3, the above-described corresponding ECU in the second vehicle 4, when a memory provided in this ECU has a sufficient storage capacity, may be configured to receive the above-described software program via the second OTA management unit 43 and store the received software program in the above-described memory, even when the second vehicle 4 is in use. Subsequently, the above-described corresponding ECU may perform processing for installing the above-described stored software program when the second vehicle 4 is not in use.

The second information collection unit 44 collects information about the second function that is the function installed on the second vehicle 4 (that is, the function provided by the ECU of the second ECU group 7). The second information collection unit 44 transmits the collected information about the second function to the function management server 2. As described above, the information about the second function to be transmitted to the function management server 2 includes information on the use frequency of the above-described function installed on the second vehicle 4. Further, the second information collection unit 44 transmits the information about the function installed on the second vehicle 4 to the second settlement processing unit 46 and the settlement management unit 47 described below.

The second guidance unit 45, when the user U gets on the second vehicle 4 or in response to detection of a start of riding the second vehicle 4 by the user U, performs guidance for the user U about the superordinate function added to the second vehicle 4. Here, the wording "when the user U gets on" indicates, for example, the timing when a door on a driver's seat side of the second vehicle 4 is opened and closed after a door lock is released by the user U, and the wording "in response to detection of a start of riding" indicates the timing when the user U turns on an ignition switch or a power switch of the second vehicle 4.

As described above, the superordinate function is the function added to the second vehicle 4 by installing the above-described addition program transmitted from the function management server 2 to the second vehicle 4 in the ECU of the second ECU group 7 via the second OTA management unit 43. The above-described guidance may be defined, for example, as notification of the added superordinate function or explanation about contents and/or way to use of the added superordinate function. Information about the contents or the like of the superordinate function required for the above-described guidance may be defined as being acquired from the function management server 2.

Further, the second guidance unit 45 queries the user U about whether to add the above-described superordinate function to the first vehicle 3. This query may be made at a predetermined occasion including the time when the user U finishes using the second vehicle 4. Here, the end of usage may be defined, for example, as the time when the user U turns off the power of the second vehicle 4.

Further, the second guidance unit 45 may be configured to make the above-described query about the superordinate function that has been used by the user U in the second vehicle 4 a predetermined number of times or more, among the above-described superordinate functions added to the second vehicle 4. This makes it possible to prevent the user U from being bothered by unnecessary queries about the superordinate function that is of little interest to the user U and is used less frequently, and therefore convenience for the user U can be improved.

Further, a display device and/or a speaker (none of which is illustrated) provided in the second vehicle 4 may be configured to perform the above-described guidance and query by the second guidance unit 45.

The second settlement processing unit 46 performs settlement related processing for the fees (for example, usage fees or purchase fees) relevant to usage of the function installed on the second vehicle 4. However, if an instruction from the below-described settlement management unit 47 prohibits execution of the settlement related processing for a specific function, the second settlement processing unit 46 does not execute settlement processing for this function. Here, as described above, the settlement related processing may include, for example, transmission or relay communication of private information (for example, credit card information, bank account information, etc.) to a server of a financial institution involved in the settlement.

The settlement management unit 47 manages the above-described settlement related processing to be executed by the second settlement processing unit 46. The settlement management unit 47 prohibits the second settlement processing unit 46 from performing the settlement related processing for the fees relevant to the second function that the user U has used in the second vehicle 4. Further, the settlement management unit 47 acquires information about the second function that the user U has used in the second vehicle 4, from the second information collection unit 44. Then, the settlement management unit 47 prohibits the second settlement processing unit 46 from performing the settlement related processing for the fees (usage fee and/or purchase fee) relevant to the second function that the user U has used in the second vehicle 4. This makes it possible to prevent the user U from inadvertently transmitting private information such as credit card information required for the settlement of the fees, for example, through the second settlement processing unit 46 of the second vehicle 4, which is only used temporarily, and therefore convenience for the user U can be improved.

Further, the settlement management unit 47 transmits the above-described information about the second function that the user U has used in the second vehicle 4, which has been acquired from the second information collection unit 44 via, for example, the function management server 2, to the first management device 6 of the first vehicle 3.

Figure 5:
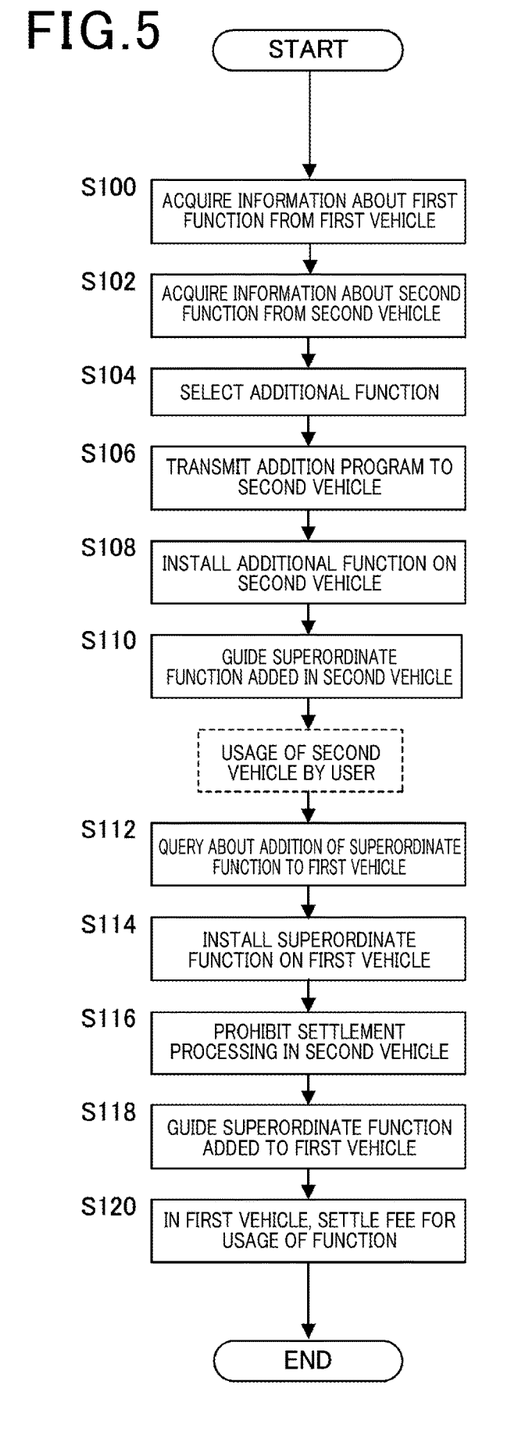
FIG. 5 is a flow diagram illustrating the procedure of processing performed by the function management system.

Next, the procedure of processing to be performed by the function management system 1 will be described. FIG. 5 is a flow diagram illustrating the procedure of processing to be performed by the function management system 1. This processing starts, for example, when the function management server 2 receives a request of using the second vehicle 4 from the portable terminal 9 of the user U.

When the processing starts, first, the first acquisition unit 23 of the function management server 2 acquires information about the first function installed on that the first vehicle 3, from the first management device 6 of the first vehicle 3 (S100). Next, the second acquisition unit 24 of the function management server 2 acquires information about the second function installed on the second vehicle 4, from the second management device 8 of the second vehicle 4 (S102).

Then, the selection unit 25 of the function management server 2 selects the additional function, which is the function to be added to the second vehicle 4, based on the above-described acquired information about the first function and the second function (S104). Further, the transmission unit 26 of the function management server 2 transmits the addition program, which is the software program for adding the above-described selected additional function to the second vehicle 4, to the second vehicle 4 (S106).

The second OTA management unit 43 of the second vehicle 4 receives the above-described addition program and causes a corresponding ECU of the second ECU group 7 to install the received addition program. As a result, the additional function is installed on the second vehicle 4 (S108). Here, the additional function to be added to the second vehicle 4 by the installation of the above-described addition program includes the above-described superordinate function. When the user U starts using the second vehicle 4, the second guidance unit 45 of the second vehicle 4 performs guidance for the user U about the superordinate function added to the second vehicle 4 (S110). After that, the user U can use the second vehicle.

Next, for example, when the user U finishes using the second vehicle 4, the second guidance unit 45 of the second vehicle 4 queries the user U about whether to add the above-described superordinate function to the first vehicle 3 (S112). The second guidance unit 45 acquires an instruction with respect to the above-described query from the user U, and transmits the acquired instruction to the function management server 2. The transmission unit 26 of the function management server 2, if the instruction of the user U is affirmative, that is, when adding the superordinate function to the first vehicle 3 is instructed, transmits the addition program of the superordinate function to the first vehicle 3. This causes the first OTA management unit 33 of the first vehicle 3 to instruct a corresponding ECU to install the above-described addition program, and as a result, the above-described superordinate function is installed on the first vehicle 3 (S114).

Further, when the user U finishes using the second vehicle 4, the settlement management unit 47 of the second vehicle 4 prohibits the second settlement processing unit 46 from performing settlement related processing for the fees relevant to the function that the user U has used in the second vehicle 4 (S116). Further, the settlement management unit 47 transmits, via the function management server 2, the information about the function that the user U has used in the second vehicle 4, to the first management device 6 of the first vehicle 3.

The first guidance unit 35 of the first vehicle 3 guides the superordinate function added to the first vehicle 3, when the user U starts using the first vehicle 3 (S118). Further, the first settlement processing unit 36 performs settlement related processing for the function that the user U has used in the second vehicle 4 (S120). As a result, the processing to be performed by the function management system 1 ends.

OTHER EMBODIMENTS

The settlement management unit 47 that manages the execution of the settlement related processing in the second settlement processing unit 46 of the second vehicle 4 may be provided in the function management server 2, although the above-described embodiment discloses the settlement management unit provided in the second management device 8 of the second vehicle 4.

Further, the software program installed in each ECU of the first ECU group 5 of the first vehicle 3 and the second ECU group 7 of the second vehicle 4 may be stored in a storage device (for example, the first memory 21) of the function management server 2, although the above-described embodiment discloses the software program stored in the software management server 11.

The second acquisition unit 24 may be configured to acquire the second function, in advance, from a vehicle that may serve as the second vehicle 4 and store the acquired function in the vehicle information DB 27, although the above-described embodiment discloses acquiring the information about the second function that is the function installed on the second vehicle 4 in response to reception of the reservation using the second vehicle 4 from the portable terminal 9 of the user U of the first vehicle 3. In this case, the transmission unit 26 may be configured to perform transmission of the addition program to the second vehicle 4 in response to reception of a reservation of using the second vehicle 4 from the portable terminal 9 of the user U of the first vehicle 3 (that is, in response to reception of a reservation for use).

Although the above-described embodiment discloses the first settlement processing unit 36 of the first vehicle 3 that performs the settlement processing for the function that the user U has used in the second vehicle 4, the portable terminal 9 owned by the user U may be used to perform this settlement processing.

The present invention is not limited to the configurations of the above-described embodiments, and can be implemented in various forms without departing from the gist of the present invention.

[Configurations Supported by the Above-Described Embodiment]

The above-described embodiments support the following configurations.

(Configuration 1)

A function management system that manages functions installed on a vehicle, the function management system including a first acquisition unit configured to acquire information about a first function that is a function installed on a first vehicle, a second acquisition unit configured to acquire information about a second function that is a function installed on a second vehicle, a selection unit configured to select, based on the information about the first function and the information about the second function, an additional function that is a function to be added to the second vehicle, and a transmission unit configured to transmit, to the second vehicle, an addition program that is a program for adding the additional function.

According to the function management system of configuration 1, when a user uses a plurality of vehicles, differences in vehicle functions among the vehicles can be reduced and therefore convenience for the user can be improved.

(Configuration 2)

The function management system according to the configuration 1, in which the transmission unit transmits the addition program to the second vehicle, in response to reception of a reservation from a user for using the second vehicle.

According to the function management system of configuration 2, the second vehicle can be brought into a state where the additional function is already installed at the user's getting-on time, and therefore convenience for the user can be improved.

(Configuration 3)

The function management system according to the configuration 1 or 2, in which the transmission unit transmits the addition program to the second vehicle, by a scheduled time of a user getting on the second vehicle.

According to the function management system of configuration 3, the second vehicle can be brought into a state where the additional function is already installed at the user's getting-on time, and therefore convenience for the user can be improved.

(Configuration 4)

The function management system according to any one of configurations 1 to 3, in which the additional function includes a function that is a function included in the first function but not included in the second function.

According to the function management system of configuration 4, functions similar to those of the first vehicle can be used in the second vehicle, and therefore convenience for the user can be improved.

(Configuration 5)

The function management system according to any one of configurations 1 to 4, in which the information about the first function includes information on a use frequency of the first function installed on the first vehicle, and the transmission unit transmits, to the second vehicle, functions included in the additional function in order of the use frequency of the first function corresponding to the function to be transmitted.

According to the function management system of configuration 5, for example, even when it takes time to install addition programs and accordingly installation of all the additional functions cannot be completed before the user gets on the second vehicle, it is at least possible for the user to use functions frequently used in the second vehicle, and therefore convenience for the user can be improved.

(Configuration 6)

The function management system according to any one of configurations 1 to 5, in which the additional function includes a superordinate function that includes a new function, which is a function not included in the first function, or an updated version function obtained by updating the function included in the first function.

According to the function management system of configuration 6, for example, it becomes possible for a vendor of the first and second vehicles to enable users to try the new function or the updated version function described above in the second vehicle, and therefore it is possible to promote sales of these functions.

(Configuration 7)

The function management system according to the configuration 6, further including a second guidance unit provided in the second vehicle and configured to perform, when a user of the first vehicle gets on the second vehicle, guidance for the user about the superordinate function.

According to the function management system of configuration 7, the user can easily obtain knowledge about the superordinate function.

(Configuration 8)

The function management system according to configuration 6, further including a second guidance unit provided in the second vehicle and configured to perform, in response to detection of a start of riding the second vehicle by a user of the first vehicle, guidance for the user about the superordinate function.

According to the function management system of configuration 8, the user can easily obtain knowledge about the superordinate function.

(Configuration 9)

The function management system according to configuration 7 or 8, in which the second guidance unit queries the user about whether to add the superordinate function to the first vehicle.

According to the function management system of configuration 9, addition of the superordinate function to the first vehicle can be performed based on the determination of the user, and therefore convenience for the user can be improved.

(Configuration 10)

The function management system according to configuration 9, in which the second guidance unit makes the query at a predetermined occasion including a time when the user finishes using the second vehicle.

According to the function management system of configuration 10, since it is possible to prevent the query from being made at an unnecessary timing, the user will not be bothered.

(Configuration 11)

The function management system according to configuration 9 or 10, in which the second acquisition unit acquires information on the number of times that the user uses each of the superordinate function in the second vehicle, and the second guidance unit makes the query about the superordinate function that has been used a predetermined number of times or more.

According to the function management system of configuration 11, the user will not be bothered by unnecessary queries about the superordinate function that is of little interest to the user and is used less frequently, and therefore convenience for the user can be improved.

(Configuration 12)

The function management system according to configuration 11, in which when the user instructs to add the superordinate function to the first vehicle in response to the query, the transmission unit transmits, to the first vehicle, the addition program for adding the instructed superordinate function, and the first vehicle has a first guidance unit provided in the first vehicle and configured to perform guidance about the superordinate function added to the first vehicle at the user's getting-on time.

According to the function management system of configuration 12, since the user can listen to the guidance of the superordinate function even in the first vehicle, it becomes easier to grasp the contents of the superordinate function.

(Configuration 13)

The function management system according to any one of configurations 1 to 12, further including a second settlement processing unit provided in the second vehicle and configured to execute settlement related processing for fees relevant to usage of the function installed on the second vehicle, and a settlement management unit configured to manage execution of the settlement related processing in the second settlement processing unit, in which the settlement management unit prohibits the second settlement processing unit from executing the settlement related processing for the fees relevant to the function that the user of the first vehicle has used in the second vehicle.

According to the function management system of configuration 13, the user does not inadvertently transmit private information such as credit card information required for the settlement of fees, for example, through the second settlement processing unit of the second vehicle, which is only used temporarily, and therefore convenience for the user can be improved.

(Configuration 14)

The function management system according to configuration 13, further including a first settlement processing unit provided in the first vehicle and configured to execute settlement related processing for the fees relevant to the function that the user has used in the second vehicle.

According to the function management system of configuration 14, a user can settle the fees, for example, in the first vehicle owned by the user, and therefore convenience for the user can be improved.

(Configuration 15)

A function management method that is performed by at least one computer provided in a function management system that manages functions to be installed on a vehicle, the function management method including a first step of acquiring information about a first function that is a function installed on a first vehicle, a second step of acquiring information about the second function that is a function installed on a second vehicle, a third step of selecting, based on the information about the first function and the information about the second function, an additional function that is a function to be added to the second vehicle, and a fourth step of transmitting, to the second vehicle, an addition program that is a program for adding the additional function.

According to the function management method of configuration 15, when a user uses a plurality of vehicles, differences in vehicle functions among the vehicles can be reduced and therefore convenience for the user can be improved.

REFERENCE SIGNS LIST

1: function management system
2: function management server
3: first vehicle
4: second vehicle
5: first ECU group
6: first management device
7: second ECU group
8: second management device
9: portable terminal
10: communication network
11: software management server
20: first processor
21: first memory
22: first communication device
23: first acquisition unit
24: second acquisition unit 25: selection unit
26: transmission unit
27: vehicle information DB
28: first management program
30: second processor
31: second memory
32: second communication device
33: first OTA management unit
34: first information collection unit
35: first guidance unit
36: first settlement processing unit
37: second management program
40: third processor
41: third memory
42: third communication device
43: second OTA management unit
44: second information collection unit
45: second guidance unit
46: second settlement processing unit
47: settlement management unit
48: third management program
U: user

What is claimed is:

1. A function management system that manages functions installed on a vehicle, the function management system comprising a first processor that includes:
   a first acquisition unit configured to acquire information about a first function that is a function installed on a first vehicle;
   a second acquisition unit configured to acquire information about a second function that is a function installed on a second vehicle;
   a selection unit configured to select, based on the information about the first function and the information about the second function, an additional function that is a function to be added to the second vehicle; and
   a transmission unit configured to transmit, to the second vehicle, an addition program that is a program for adding the additional function.

2. The function management system according to claim 1, wherein
   the transmission unit transmits the addition program to the second vehicle, in response to reception of a reservation from a user for using the second vehicle.

3. The function management system according to claim 1, wherein
   the transmission unit transmits the addition program to the second vehicle, by a scheduled time of a user getting on the second vehicle.

4. The function management system according to claim 1, wherein
   the additional function includes a function that is included in the first function but not included in the second function.

5. The function management system according to claim 1, wherein
   the information about the first function includes information on a use frequency of the first function installed on the first vehicle, and
   the transmission unit transmits, to the second vehicle, functions included in the additional function in order of the use frequency of the first function corresponding to the function to be transmitted.

6. The function management system according to claim 1, wherein
   the additional function includes a superordinate function that includes a new function, which is a function not included in the first function, or an updated version function obtained by updating the function included in the first function.

7. The function management system according to claim 6, wherein
   the second vehicle comprises a second processor that includes a second guidance unit provided in the second vehicle and configured to perform, when a user of the first vehicle gets on the second vehicle, guidance for the user about the superordinate function.

8. The function management system according to claim 6, wherein
   the second vehicle comprises a second processor that includes a second guidance unit provided in the second vehicle and configured to perform, in response to detection of a start of riding the second vehicle by a user of the first vehicle, guidance for the user about the superordinate function.

9. The function management system according to claim 7, wherein
   the second guidance unit queries the user about whether to add the superordinate function to the first vehicle.

10. The function management system according to claim 9, wherein
    the second guidance unit makes the query at a predetermined occasion including a time when the user finishes using the second vehicle.

11. The function management system according to claim 9, wherein
    the second acquisition unit acquires information on the number of times that the user uses each of the superordinate function in the second vehicle, and
    the second guidance unit makes the query about the superordinate function that has been used a predetermined number of times or more.

12. The function management system according to claim 11, wherein
    when the user instructs to add the superordinate function for the first vehicle in response to the query, the transmission unit transmits, to the first vehicle, the addition program for adding the instructed superordinate function, and
    the first vehicle comprises a third processor that includes a first guidance unit provided in the first vehicle and configured to perform guidance about the superordinate function added to the first vehicle at the user's getting-on time.

13. The function management system according to claim 1, wherein
    the second vehicle comprises a second processor that includes a second settlement processing unit provided in the second vehicle and configured to execute settlement related processing for a fee relevant to usage of the function installed on the second vehicle, and
    the first processor or the second processor includes a settlement management unit configured to manage execution of the settlement related processing in the second settlement processing unit, in which the settlement management unit prohibits the second settlement processing unit from executing the settlement related processing for a fee relevant to the function that the user of the first vehicle has used in the second vehicle.

14. The function management system according to claim 13, wherein
    a third processor of the first vehicle or a portable terminal of the user includes a first settlement processing unit provided in the first vehicle and configured to execute the settlement related processing for a fee relevant to the function that the user has used in the second vehicle.

15. A function management method that is performed by at least one computer provided in a function management system that manages functions to be installed on a vehicle, the function management method comprising:
- a first step of acquiring information about a first function that is a function installed on a first vehicle;
- a second step of acquiring information about a second function that is a function installed on a second vehicle;
- a third step of selecting, based on the information about the first function and the information about the second function, an additional function that is a function to be added to the second vehicle; and
- a fourth step of transmitting, to the second vehicle, an addition program that is a program for adding the additional function.

* * * * *